(12) United States Patent  
Benedek et al.

(10) Patent No.: US 12,496,372 B2  
(45) Date of Patent: Dec. 16, 2025

(54) METHOD AND APPARATUS FOR AIR TREATMENT INCLUDING LIGHT BAFFLE CATALYST

(71) Applicant: Middleby Marshall Inc., Elgin, IL (US)

(72) Inventors: Karen R. Benedek, Winchester, MA (US); Philip C. Carbone, North Reading, MA (US); Peter J. Loftus, Cambridge, MA (US); David J. Hensel, Somerville, MA (US)

(73) Assignee: Middleby Marshall Inc., Elgin, IL (US)

( * ) Notice: Subject to any disclaimer, the term of this patent is extended or adjusted under 35 U.S.C. 154(b) by 936 days.

(21) Appl. No.: 17/519,843

(22) Filed: Nov. 5, 2021

(65) Prior Publication Data

US 2022/0133942 A1  May 5, 2022

Related U.S. Application Data

(60) Provisional application No. 63/110,103, filed on Nov. 5, 2020.

(51) Int. Cl.
*A61L 9/20* (2006.01)
*F24C 15/20* (2006.01)

(52) U.S. Cl.
CPC .............. *A61L 9/205* (2013.01); *F24C 15/20* (2013.01); *A61L 2209/12* (2013.01); *A61L 2209/134* (2013.01)

(58) Field of Classification Search
CPC ....................................................... A61L 9/205
See application file for complete search history.

(56) References Cited

U.S. PATENT DOCUMENTS 8,114,358 B2   2/2012  Benedek et al.
8,388,900 B2   3/2013  Benedek et al.
(Continued)

FOREIGN PATENT DOCUMENTS

CN      111744046 A      10/2020
KR   10-2005-0060304 A    6/2005
KR      20200099341 A  *  8/2020

OTHER PUBLICATIONS

English Translation of Document ID No. KR 20200099341 A provided by the United States Patent Office Search Database: Kim, Do Yub; Deodorizing Unit and Air Purifier; Aug. 24, 2020 (Year: 2020).*

(Continued)

*Primary Examiner* — Kevin Joyner
(74) *Attorney, Agent, or Firm* — Christopher G. Darrow; Darrow Mustafa PC

(57) ABSTRACT

An apparatus and method for treating air includes a UV illumination source in a housing and arranged to expose air to UV illumination suitable to inactivate microorganisms. One or more light baffles can be arranged so that UV illumination is incident on an inlet or outlet side of the light baffle. First and second light baffles can operate as a catalyst element and each can respectively have first and second pluralities of air flow channels extending in first and second directions from an inlet side to an outlet side of the light baffle. The first and second directions can be arranged at an angle such that UV illumination is prevented transmission through the first and second light baffles. Air flow channels of a baffle can extend in a direction from an inlet side to an outlet side of the light baffle and can be inclined relative to the inlet side of the baffle by a slant angle of 10 degrees to 45 degrees. The slant angle can be at least the arcsin of the ratio of the flow channel opening size to the baffle depth.

14 Claims, 10 Drawing Sheets

(56) References Cited

U.S. PATENT DOCUMENTS

| | | |
|---|---|---|
| 10,054,321 B2 | 8/2018 | Carbone et al. |
| 10,702,623 B2 | 7/2020 | Carbone et al. |
| 10,898,604 B2 | 1/2021 | Benedek et al. |
| 10,933,158 B2 | 3/2021 | Benedek et al. |
| 10,933,159 B2 | 3/2021 | Benedek et al. |
| 11,585,546 B2 * | 2/2023 | Park .................. B01D 53/8668 |
| 11,788,746 B2 * | 10/2023 | Jeong ................ B01D 46/0005 |
| | | 422/121 |
| 2005/0000365 A1 * | 1/2005 | Nelsen ...................... F24F 8/80 |
| | | 96/224 |
| 2013/0052090 A1 | 2/2013 | Bohlen |
| 2015/0224218 A1 * | 8/2015 | Burnett .................. A61L 9/205 |
| | | 29/458 |
| 2018/0126028 A1 | 5/2018 | Engelhard |
| 2021/0106715 A1 | 4/2021 | Benedek et al. |
| 2021/0108810 A1 | 4/2021 | Benedek et al. |
| 2021/0170063 A1 | 6/2021 | Benedek et al. |

OTHER PUBLICATIONS

PCT/US2021/058248, Feb. 23, 2022, Invitation to Pay Additional Fees.
PCT/US2021/058248, Apr. 13, 2022, International Search Report and Written Opinion.
International Preliminary Report on Patentability for International Application No. PCT/US2021/058248, mailed May 19, 2023.
Invitation to Pay Additional Fees for International Application No. PCT/US2021/058248, mailed Feb. 23, 2022.
International Search Report and Written Opinion for International Application No. PCT/US2021/058248, mailed Apr. 13, 2022.

* cited by examiner

METHOD AND APPARATUS FOR AIR TREATMENT INCLUDING LIGHT BAFFLE CATALYST

RELATED APPLICATIONS

This application claims the benefit under 35 U.S.C. § 119(e) to U.S. Provisional Application Ser. No. 63/110,103, entitled "METHOD AND APPARATUS FOR AIR TREATMENT INCLUDING LIGHT BAFFLE CATALYST" and filed Nov. 5, 2020, which is herein incorporated by reference in its entirety.

BACKGROUND

1. Field of Invention

This invention relates to cleaning air, such as air cleaning systems that treat air by removing one or more impurities from the air.

2. Related Art

Residential, commercial, industrial, and/or automotive spaces can have atmospheres that are contaminated with odors, gases, volatile organic compounds (VOCs), grease, microbes or volatile inorganic compounds that cause discomfort or health hazards, for example, to people occupying those spaces. Conventional air cleaning technologies filter the air with materials that trap or otherwise adsorb or absorb gases, odors, or aerosols. These trapped or otherwise held contaminants are present in the filters and can be re-emitted into the atmosphere. For example, activated carbon is typically used to capture odors and/or volatile compounds from the air, and it is well known that activated carbon captures more contaminants when the contaminant concentration is high. However, when the contaminant concentration decreases, adsorbed gases begin to desorb from the activated carbon and are released back into the air.

SUMMARY OF INVENTION

In one aspect, the subject matter disclosed herein relates to methods or assemblies for treating air to remove impurities. Such impurity removal may involve one or more of a treatment to sanitize, filter, decontaminate, deodorize, purify, condition, heat, humidify, and/or dry an atmosphere, for example. Such methods and assemblies may employ a particulate filter to remove aerosols and particulate matter, a low temperature oxidizing catalyst to convert chemical compounds in the air into less harmful or less odorous constituents, a heater to provide heat to the catalyst to oxidize residual contaminants at a higher temperature, a fan or other air mover to draw air through the system, a sensor to detect one or more temperatures, air flow rate and/or other conditions, and a controller to control components such as the heater and/or air mover based on the inputs from sensed conditions or other operational parameters. In some embodiments, an air treatment apparatus or method can be employed in a ceiling space of a room and arranged to draw air in through a ceiling surface, treat the air such as by removing volatile organic compounds (VOCs) and/or inactivating microbes such as viruses and/or bacteria, and return the treated air to the room. In one aspect of the invention, the materials, apparatuses and assemblies are employed in a kitchen space to help manage grease and odors that are created from the cooking process. In another aspect of the invention, the air cleaning product or apparatus is integrated into and/or within an automobile, e.g., where it is connected electronically to the remote starter, automobile cabin temperature sensor, and/or air conditioning system to remove VOCs that evolve from the cabin materials.

One air cleaning approach involves converting odors, gases and/or other contaminants into harmless compounds that are not noticed by and/or do not cause harm to occupants in the room. In some cases, contaminants converted by the system are fully oxidized and do not produce significant secondary contaminants. It can also be desirable to have an air treatment apparatus that offers a self-clean cycle that deodorizes, oxidizes or otherwise cleans its internal components of or from captured contaminants that cause odors or that could decrease the performance of the components, e.g., a catalyst is periodically refreshed so that its performance is maintained over time.

In some embodiments, an air treatment apparatus includes a housing having an air inlet, an air outlet, and an air mover arranged to move air along an air flow path in the housing from the air inlet to the air outlet. A light baffle, e.g., including one or more catalyst or other layers, may be arranged in the air flow path such that air moves along the air flow path through the light baffle, but light emitted by a UV illumination source in the housing cannot pass through the light baffle. In some embodiments, the light baffle is arranged so that air moves along the air flow path from a first catalyst layer to a second catalyst layer downstream of the first catalyst layer. Each of the catalyst layers can extend across the air flow path and be arranged to adsorb and oxidize contaminants, e.g., at room or ambient temperatures. The first and second catalyst layers can each have air flow channels that extend in respective first and second directions, and the catalyst layers can be arranged so that the first and second directions and the air flow channels allow the catalyst layers to prevent light that is incident on the first (or second) catalyst layer from being transmitted through the second (or first) catalyst layer. This can prevent UV light used to treat air in the housing from exiting an air inlet or outlet of the housing. The air treatment apparatus can have any or all of the features described herein.

In some embodiments, an air treatment apparatus includes a housing having an air inlet, an air outlet and an air flow path through the housing from the air inlet to the air outlet. In some cases, a straight line can extend from the air inlet to the air outlet along which the air flow path extends. An air mover can be arranged to move air from the air inlet to the air outlet along the air flow path, e.g., a fan or other air mover can be configured near or at the air inlet or air outlet. A UV illumination source can be in the housing and arranged along the air flow path to expose air moving along the air flow path to UV illumination suitable to inactivate microorganisms in the air. A first catalyst element having a first plurality of air flow channels extending from an inlet side to an outlet side of the first catalyst element can be configured in the housing such that the first plurality of air flow channels extend in a first direction and transmit air moving along the air flow path. A second catalyst element can be positioned upstream of the first catalyst element along the air flow path and have a second plurality of air flow channels extending from an inlet side to an outlet side of the second catalyst element. The second plurality of air flow channels can extend in a second direction and be arranged to transmit air moving along the air flow path. In some cases, the first and second catalyst elements can be arranged with the first and second directions at an angle relative to each other such that UV illumination from the UV illumination source that is incident on the inlet side of the second catalyst element (where the first and second catalyst elements are located downstream of the UV illumination source) or incident on the outlet side of the first catalyst element (where the first and second catalyst elements are located upstream of the UV illumination source) is prevented from being transmitted to the air outlet or the air inlet, respectively.

In some embodiments, the first and second catalyst elements are arranged with the first and second directions at an angle relative to each other such that no straight line light path exists from the outlet side of the first catalyst element to the inlet side of the second catalyst element.

In some cases, the first and second catalyst elements are arranged upstream of the UV illumination source, e.g., so that UV illumination is prevented from exiting the air inlet by the first and second catalyst elements. In some embodiments, the UV illumination source is arranged to emit UV illumination directly to the outlet side of the first catalyst element, i.e., no light baffle or other component blocks a light path from the UV illumination source to the first catalyst element. Also, in some cases the apparatus can be arranged such that without the first and second catalyst layers installed in the housing, UV illumination can pass directly from the UV illumination source to exit the air inlet. Thus, the first and second catalyst elements may be the only components preventing at least some UV illumination from exiting the housing via the air inlet.

In some cases, the first and second catalyst elements are arranged downstream of the UV illumination source, e.g., so that UV illumination is prevented from exiting the air outlet by the first and second catalyst elements. In some embodiments, the UV illumination source is arranged to emit UV illumination directly to the inlet side of the second catalyst element, i.e., no light baffle or other component blocks a light path from the UV illumination source to the second catalyst element. Also, in some cases the apparatus can be arranged such that without the first and second catalyst layers installed in the housing, UV illumination can pass directly from the UV illumination source to exit the air outlet. Thus, the first and second catalyst elements may be the only components preventing at least some UV illumination from exiting the housing via the air outlet. In some cases, the air mover is positioned between the air outlet and the UV illumination source, and the first and second catalyst elements are positioned between the air mover and the UV illumination source.

In some embodiments, walls that define the first and second pluralities of air flow channels are straight relative to the first and second directions, respectively. For example, the air flow channels can be formed as tubes with a constant cross sectional area along a length of the flow channel.

In some cases, a line extending from the air inlet to the air outlet passes through the first and second catalyst elements and the UV illumination source. For example, air can flow through the housing from the air inlet to the air outlet along a straight line in at least some circumstances. In some embodiments, the UV illumination source is in a UV chamber and air flow along the air flow path in the UV chamber is along a straight line.

In some cases, the first and second catalyst elements are arranged to remove VOCs from air passing through the first and second catalyst elements. In some embodiments, the first and second catalyst elements are arranged to permit and/or create uniform flow, e.g., in a UV treatment chamber, that leads to 90% to 100% inactivation per pass of aerosolized *bacillus atrophaeus* spores and MS-2 bacteriophage through the housing. In some embodiments, the first and second catalyst elements are arranged to provide a pressure drop of 3 to 6 mm H2O for face velocities of 0.5 to 1.5 m/sec. Such low pressure drop performance can help reduce noise and/or energy needed to move air through the housing.

In some embodiments, the UV illumination source includes an upper pair of UV emitters spaced apart a first distance and a lower pair of UV emitters spaced apart a second distance that is less than the first distance. The first and second distances can be measured along a direction that is perpendicular to an air flow direction near the UV emitters and/or to the air flow path. In some cases, the UV emitters each extend along the air flow path, e.g., include elongated bulbs or light emitters arranged in a direction that extends along the air flow path.

In some cases, the inlet side of the first catalyst element is spaced apart from the outlet side of the second catalyst element. For example, the inlet side of the first catalyst element can be spaced apart from the outlet side of the second catalyst element by a distance that is greater than a length between the inlet and outlet side of each the first and second catalyst elements. In other words, the first and second catalyst elements can each have a depth or length along which the air flow channels extend that is less than a distance the inlet side of the first catalyst element is spaced apart from the outlet side of the second catalyst element. In some cases, the air mover is positioned within the housing and at a distance of at least 0.5 inches from the inlet side of the second catalyst element, e.g., with the air mover positioned downstream of the catalyst elements.

In some embodiments, the inlet side and the outlet side of the first and second catalyst elements each have an inlet plane and an outlet plane, respectively, and the inlet plane is parallel to the outlet plane in each of the first and second catalyst elements. The air flow channels can be configured in the first and second catalyst elements so that they are perpendicular to their respective inlet and outlet sides. That is, the first direction of the first plurality of air flow channels in the first catalyst element can be perpendicular to the inlet plane and the outlet plane of the first catalyst element. Also, the second direction of the second plurality of air flow channels in the second catalyst element can be perpendicular to the inlet plane and the outlet plane of the second catalyst element. In some cases, the first and second catalyst elements can be configured identically and can be interchangeable. The first and second catalyst elements can be arranged so that the direction of the air flow channels for one of the catalyst elements is parallel to the air flow path where the catalyst elements are positioned, and so that the direction of the air flow channels for the other of the catalyst elements is arranged at a slant angle relative to the air flow path. The catalyst element can be oriented in the air flow path so that the slant angle to the air flow path is at least the arctan of the ratio of an opening size of each of the air flow channels to a length of each of the air flow channels. The opening size can be a maximum distance across the air flow channel in a direction perpendicular to the direction in which the air flow channels extend, and the length can be the length of the air flow channels or the distance from the inlet side to the outlet side of the catalyst element. As an example, the second catalyst element can be oriented so that the second direction is parallel to the air flow path, and the first catalyst element can be oriented so that the first direction is at a slant angle that is at least the arctan of the ratio of the opening size to the length of each of the first plurality of air flow channels. This configuration can ensure that light cannot pass through both the first and second catalyst elements.

In some embodiments, an air treatment apparatus includes an air treatment apparatus includes a housing having an air inlet, an air outlet and an air flow path through the housing from the air inlet to the air outlet. In some cases, a straight line can extend from the air inlet to the air outlet along which the air flow path extends. An air mover can be arranged to move air from the air inlet to the air outlet along the air flow path, e.g., a fan or other air mover can be configured near or at the air inlet or air outlet. A UV illumination source can be in the housing and arranged along the air flow path to expose air moving along the air flow path to UV illumination suitable to inactivate microorganisms in the air. A light baffle having a first plurality of air flow channels arranged to transmit air moving along the air flow path can be configured in the housing. The air flow channels can extend in a first direction from an inlet side to an outlet side of the light baffle, with the inlet side and the outlet side being separated by a baffle depth of 0.25 inches to 4 inches. For example, the air flow channels can extend approximately 0.25 to 4 inches through the baffle depth of the light baffle. The first direction for the air flow channels can be inclined relative to a line perpendicular to a plane of the inlet side (or relative to an air flow path through the housing) by a slant angle of 10 degrees to 45 degrees. Each of the air flow channels can have an opening size that is a maximum distance across the air flow channel in a direction perpendicular to the first direction, and the slant angle can be at least the arcsin of the ratio of the opening size to the baffle depth. In other words, the air flow channels can be relatively narrow in cross sectional size relative to their length. Thus, with the light baffle positioned upstream of the UV illumination source along the air flow path, the light baffle can be arranged such that UV illumination from the UV illumination source that is incident on the outlet side of the light baffle is prevented from being transmitted to the air inlet. Alternately, with the light baffle positioned downstream of the UV illumination source along the air flow path, the light baffle can be arranged such that UV illumination from the UV illumination source that is incident on the inlet side of the light baffle is prevented from being transmitted to the air outlet. In some cases, the light baffle can be the only element that prevents at least some UV illumination from exiting the air inlet or outlet. In some cases, the light baffle can have two sets of air flow channels, with a first set positioned upstream of and extending along a direction that is different than a second set of air flow channels.

In some embodiments, a controller is arranged to control operation of the air mover and/or a heater to operate in an air cleaning mode and a self-cleaning mode. The air cleaning mode includes operation of the air mover to move air along the air flow path at a first flow rate and deactivation of the heater, i.e., so the catalyst layers operate to adsorb and oxidize contaminants at room or ambient temperature. The self-cleaning mode includes operation of the air mover to move air along the air flow path at a second flow rate that is lower than the first flow rate and activation of the heater to radiate heat toward the plurality of catalyst layers. In some cases, the catalyst layers are between 300 to 400 degrees F. during the self-cleaning mode.

There are a number of applications for air cleaning where the need to clean the air is periodic rather than continuous. In a room that is periodically occupied by people, an air treatment apparatus can operate only while people are present, e.g., to help reduce the spread of viruses and/or other microbes in the room by inactivating the microbes. In a residential kitchen, for example, cooking appliances are used for periods around mealtimes but are unused for much of the day or night. In this case, an air cleaner may operate while the odors are being generated and/or after the period of active cooking. An air cleaner may have different modes that operate at different times, for example, to remove contaminants from the air and oxidize the contaminants at a low temperature on the surface of a catalyst in one mode and oxidize any residual contaminants at a higher temperature in a second mode. A third mode could include driving off any final residual contaminants that resist low or higher temperature oxidation. This third mode could be accomplished when a ventilation source such as a vent hood is exhausting air to the outside atmosphere.

There is a need for an air cleaning system that cleans cooking odors from a room such as a kitchen or combined kitchen and/or dining room. This cooking odor removal system could beneficially be configured as a built-in appliance that has a set operating cycle tied to the operation of a cooktop and ventilation hood. With a built-in system, the air cleaner and associated controller could be connected electronically to the cooktop and the ventilation hood such that the ventilation hood operates when the cooktop is powered or energized. When cooking is over or complete and the cooktop power is shut off, the ventilation hood fan that exhausts air outside could be shut down and the air cleaner could be turned on. The air cleaner could then begin an air cleaning cycle that recirculates the air through the room, reducing the energy loss associated with venting air to out of doors. The recirculated air cleaning system can remove residual odors and/or aerosols of grease or oils, for example, in the air in the kitchen. This air cleaning cycle could be customized based on the size of the kitchen, for example. This cleaning cycle could include the modes of adsorbing odors and other contaminants on the surface of a catalyst at one flow rate, oxidizing the odors and other contaminants at the same or a different flow rate, oxidizing the odors and contaminants at a higher temperature and a flow rate lower than the first flow rate, and a final regeneration step that could be timed to occur when the ventilation hood is operating and venting the air to the outside atmosphere.

There is a need for an air cleaning system that could be built into an automobile and operated in conjunction with other automobile systems or characteristics, such as the internal temperature or the operation of the air conditioning system. An air cleaner built into an automobile could be activated by the remote starting fob, and/or mobile telephone, for example, so that the air begins to be cleaned before the occupant enters the car. The assembly and method can be used to treat air in the automobile, where contaminants may be generated from the interior cabin materials of the car, e.g., VOC emissions from the plastics, fabrics, glues, stabilizers and leather in a relatively new car. This emission rate can be significantly increased when the car interior is heated, such as by the sun. Contaminants in the air of an automobile cabin may also come through the ventilation system or through the windows from outside the car where pollution levels may be relatively high. Pollutants outside a car may include particulate matter, ozone, carbon monoxide, soot, VOCs, and/or other chemicals. Such VOC emissions can be controlled using a built in air treatment system that converts rather than captures these VOCs. Such an air cleaner can be built into the automobile and can be equipped with a variable speed fan to allow for the adjustment of air flow and hence the treatment rate of the air in the car cabin.

An example of an operating cycle in an automobile is that the air treatment system operates at high flow rate, for example about 10 to about 20 cfm in order to rapidly remove VOCs from the cabin air. The air cleaner may operate at this flow rate for the duration of an automobile trip. The air cleaner could be shut off when the automobile is shut off at the end of a trip. This could repeat multiple times until the air cleaner had operated for some total time, such as about 2 to about 4 hours cumulatively. After that amount of operating time, the air cleaner may be turned on at the start of an automobile trip and operate at lower flow rate, such as about 2 to about 4 cfm with a heater energized to oxidize any contaminants remaining on the catalyst. This self-clean cycle may last about 10 to 20 minutes, or as long as it takes for the temperature exhausting the catalyst to reach about 300 to 350 F for a defined period of time, say about 2 to 5 minutes.

In one embodiment, control of the air cleaner can be initiated via a mobile phone application and/or sensed conditions. For example, if the car interior temperature exceeds a certain value, the air cleaner can be automatically operated. Furthermore, operating modes can be selected depending on the presence or absence of vehicle occupants. For example, relatively high airflow provides relatively higher treatment rates, but can be too noisy for certain vehicle occupants.

In one embodiment, a driver anticipates using the car at a certain time and via an app, starts the air cleaner some time (e.g., about 5 to 30 minutes) before entering the car. The air cleaner can remove the VOCs from the interior and then shut off when the driver enters the vehicle. In another use case, a person smokes cigarettes during a drive. The user than activates the air cleaner on exiting the vehicle and the air cleaner runs for a specified cycle to remove the odor of cigarettes from the interior of the car.

Also provided are a method and device to oxidize volatile gaseous compounds, odors, and/or molecular contaminants that remain on the catalyst surface by applying heat to the air at a relatively low flow rate. The heated air is passed through the oxidizing catalyst to further oxidize or completely mineralize the transformed chemicals.

Also provided is a cycle of operation that matches the air cleaning and self-cleaning/regeneration modes of the air cleaning device to the conditions of the environment to be cleaned, whether a kitchen, for example, or an automobile.

In some embodiments, an apparatus for treating air includes a housing with an air inlet and an air outlet. The housing encloses an air treatment zone and heating zone. A first catalyst layer extends across the air treatment zone and includes a first catalyst material. A second catalyst layer is spaced apart from the first catalyst layer. The second catalyst layer may include a catalyst material that is the same as the first catalyst layer or it may include a second catalyst material that is different from the first catalyst material, such as where the first catalyst material oxidizes organic and/or inorganic compounds. Or, the first catalyst layer may contain a material that has a relatively high surface area and can adsorb chemicals and hold them for the time necessary for the chemicals to be oxidized by the adjacent active catalytic material. The chemicals can be desorbed over time from the first layer to be treated by the second layer of catalyst. In some embodiments the air treatment system includes a controller that can independently operate one or more heaters and/or the fan speed to create various modes of air cleaning or provide a self-cleaning function for the device. In some embodiments, in the apparatus for treating air, the air mover comprises a volute and a fan, with the volute being connected to an upstream area of the fan.

The downstream application can assist in increasing an oxidation rate of the chemical contaminants throughout a layer of the first catalyst material. The method can further include altering a rate at which the chemical contaminants enter a layer of the first catalyst material via a layer of adsorbent material upstream of the layer of the first catalyst material.

In some embodiments, steps and configurations for cleaning the catalyst material are provided by exposing the first catalyst material to heated air at a flow rate lower than normally used in an air treatment mode, wherein the cleaning oxidizes chemicals that have been adsorbed on the first catalyst material and require a higher temperature to fully oxidize. A predetermined operating cycle can be established including an air treatment mode and a self-cleaning mode, wherein the operating cycle comprises a first air treatment time at a first flow rate and a second self-clean time at a reduced flow rate; and operating a heater during the self-cleaning mode.

Catalysts may be specifically formulated to oxidize contaminants at a room or ambient temperature. A room temperature or relatively low temperature catalyst is one that is formulated to perform at temperatures between about 0 degrees and about 40 degrees C. Alternatively, a heater in the system could be used in conjunction with a catalyst formulated to operate at elevated temperatures. The elevated temperatures may be between about 150 degrees C. and about 200 degrees C., for example. When a catalyst is exposed to heat at a preferable temperature at a preferable space velocity, adsorbed chemicals will oxidize and the reacted products will be desorbed from the catalyst. Space velocities for this function could be as low as about 10,000 hr-1 for example. A catalyst system can be designed to adsorb contaminants such as hydrocarbons, aldehydes, amines, alcohols or other compounds at one rate; and the second catalyst designed to oxidize contaminants at a second temperature.

In some embodiments, in the apparatus for treating air, the device includes a first catalyst section holding the catalyst. In some embodiments of the section holding the catalysts, the catalyst section comprises a set of catalyst sheets or layers separated by spacers. These sheets of catalysts may be in or applied to the geometry of an expanded metal, a honeycomb, a corrugated sheet, a ceramic corrugated structure, an extruded ceramic structure, a porous foam and/or other volume with a relatively high surface area that allows air to flow through it. The spacers allow mixing of the air between the catalyst sheets, decreasing the chance that some contaminants in the air will travel through the catalyst section untreated.

In some embodiments, the catalysts may comprise active materials that oxidize chemical compounds at a room temperature. This catalyst may be made of manganese oxides, for example. In some embodiments of this invention, the catalyst comprises manganese dioxide (manganese dioxide is a general term and is intended to refer to and include different forms of manganese oxides, including but not limited to cryptomelane, Nsutite, pyrolusite, ramsdellite which is also referred to as alpha-$MnO_2$, beta-$MnO_2$ or R—$MnO_2$ or oxides of manganese with a molar ratio of oxygen to manganese of about 1 to about 3, for example). The catalyst may be enhanced by including other elements, such as sodium, cerium, copper, or precious metals to provide higher conversion or more specific conversion of individual impurities, such as volatile organic compounds.

In some embodiments, the catalyst is designed to resist the adsorption of water into the active sites of the catalyst. The adsorption of water can decrease the effectiveness with which catalysts convert ozone to oxygen. Hydrophobic compounds such as siloxanes are or can be added to catalysts to resist the adsorption of water molecules. Alternatively, the pore structure can be altered to allow water to be desorbed from the catalyst material.

The cell density of the support structures can be between about 100 and about 1000 cells per square inch, with preferable performance of cell densities of the support structures between about 350 and about 900 cells per square inch. The catalytic activity of the manganese catalyst can be enhanced by positioning UV light to shine into the cell structure. The enhancement of the reaction rate may result from increasing the energy level of adsorbed gas molecules or from creating various reactive species that cause additional oxidation of the adsorbed VOCs. The catalytic activity of the manganese catalyst may be refreshed by adding heat before and between the layers of the oxidizing catalyst to maintain an active oxidizing atmosphere throughout the catalyst layers.

In some embodiments, contaminants can be trapped and treated in or on a filter. This filter may be a high efficiency particle arresting (HEPA) filter or other particle capturing material that restricts the passage of particles or aerosols through the material. It is desirable to treat the particles on the filter so that the contaminants themselves do not degrade the performance of the filter. It is also desirable to treat the particles so that they are rendered inert and cannot cause harm if the particles come off the filter either in standard use or when replacing the filter. It is desirable to treat the particles on the filter so that they do not emit odors and/or toxic gases into the atmosphere while attached to and concentrated on the filter. It is desirable to treat any microbial particles so that the microbes cannot reproduce on the filter and sporulate or otherwise regenerate from the filter itself. In some embodiments, the apparatus for treating air further includes a material that can adsorb gases, at least temporarily. While adsorbing materials such as activated carbon and/or potassium permanganate, may not permanently hold the contaminants, they may adsorb and then desorb the gases at different rates, allowing the adsorber to change the rate at which the contaminants are released into the rest or remainder of the air treatment system. A layer of adsorbing material, such as activated carbon could be located upstream of a prefilter, downstream of the prefilter, upstream of an aerosol filter or downstream of the air filter, upstream of the catalyst layers or downstream of the first layer of catalyst in a catalyst bed. In some embodiments, aerosols of grease or oil can be trapped and treated on a cleanable grease filter that is made of metal screen, expanded metal, and/or other water washable filter.

In some embodiments, the apparatus for treating air further includes a user interface module configured to receive user input and present information to the user, and an electronic control module configured to set the apparatus to operate in one of a plurality of operation modes, wherein the plurality of operation modes includes a regular operation mode, where the heater is off and the air mover operates at a first speed. In some embodiments, in the apparatus for treating air, the plurality of operation modes further includes a self-cleaning mode, where the heater is turned on and air mover operates in a second speed lower than the first speed. In some embodiments, in the apparatus for treating air, the electronic control module is configured to set the apparatus to operate in one of a plurality of operation modes based on the user input. In some embodiments, the apparatus for treating air further includes a wireless communication module configured to communicate with a central management system. In some embodiments, in the apparatus for treating air, the electronic control module sets the apparatus to operate in one of the plurality of operation modes based on instructions received from the central management system via the wireless communication module. In some embodiments, in the apparatus for treating air, the instruction is at least partially based on information received from another appliance. In some embodiments, in the apparatus for treating air, the instruction is at least partially based on information received from the system that the appliance is built into.

In some embodiments, in the apparatus for treating air, the electronic control module is configured to set the apparatus to operate in one of a plurality of operation modes automatically based on at least one of output of at least one sensor and time.

In some embodiments, in the apparatus for treating air, the electronic control module is configured to set the apparatus to operate in one of a plurality of operation modes automatically based on at least one of an output of at least one other appliance and time. In some embodiments, in the apparatus for treating air, the at least one sensors is placed near the catalyst inlet, near the catalyst outlet, or both. In some embodiments, in the apparatus for treating air, the at least one sensor detects an occupancy of an ambient environment where the apparatus is positioned or situated. In some embodiments, in the apparatus for treating air, the at least one sensor detects a contaminant content and a level of an ambient environment where the apparatus is positioned or situated.

In some embodiments, the apparatus for treating air can be built into kitchen cabinets and connected electronically to the range and the ventilation hood. The electronic control of the apparatus could be configured to operate a set operating cycle that includes a schedule of operating modes including cleaning air from the room, self-cleaning, and deodorizing the unit itself. The duration and elements of the cycle could be customized by the homeowner by providing the controller information about the size of the kitchen, for example. The timing of the cycle could be defined by the timing of the operation of the range, or other cooking appliance that could create food odors in the kitchen, and the operation of the ventilation hood, which generally operates when the range or cooktop is in operation. The air treatment apparatus could be configured to operate after the range has been used and the ventilation hood has been turned off. Residual odors in the room would then be removed in a set cleaning cycle. An example of an operating cycle is as follows: the air treatment system operates at high flow, for example about 100 to about 200 cfm with no heater operating in order to rapidly collect aerosols of grease or smoke from the room. After this aerosol cleaning period, the air flow could reduce to about 20 to about 150 cfm. After a cleaning cycle of approximately about 1 to 3 hours, corresponding to about 1 to 15 air exchanges of the room, the air treatment system could reduce its flow rate to about 10 to 30 cfm and turn the heater on in order to deodorize and oxidize the material collected on the grease filter and catalyst. This self-clean cycle could be maintained for about 0.5 to 3 hours. These cycle elements could be operated in any sequence depending on the nature of the air in the kitchen.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Throughout this specification and in the claims, the term air treatment apparatus is intended to relate to an apparatus for sanitizing, filtering, decontaminating, deodorizing, purifying, cleaning, conditioning, heating, humidifying, drying and/or otherwise treating an atmosphere within a space.

Figure 1:
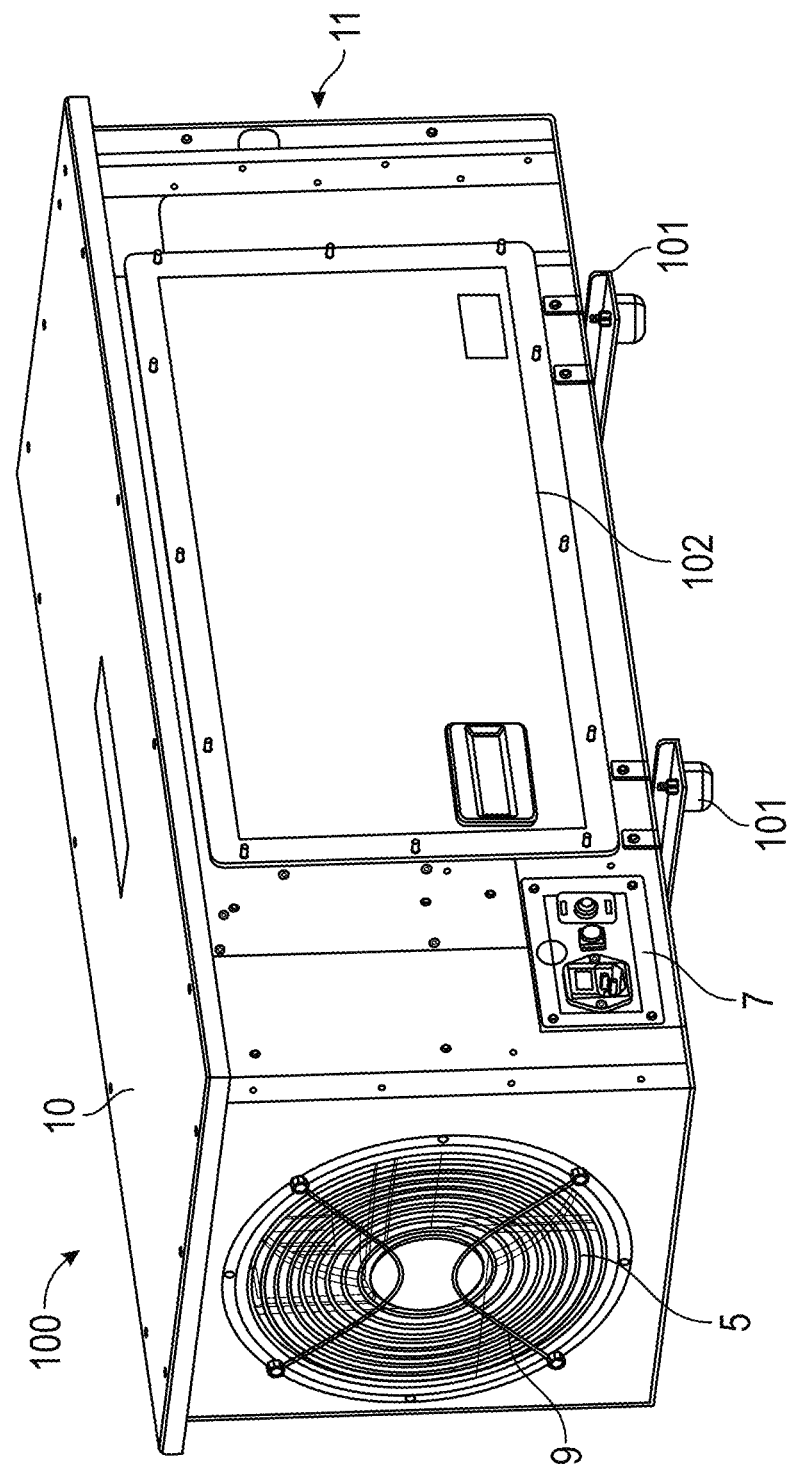
FIG. 1 shows a top front left perspective view of an air treatment apparatus in one embodiment.
Figure 2:
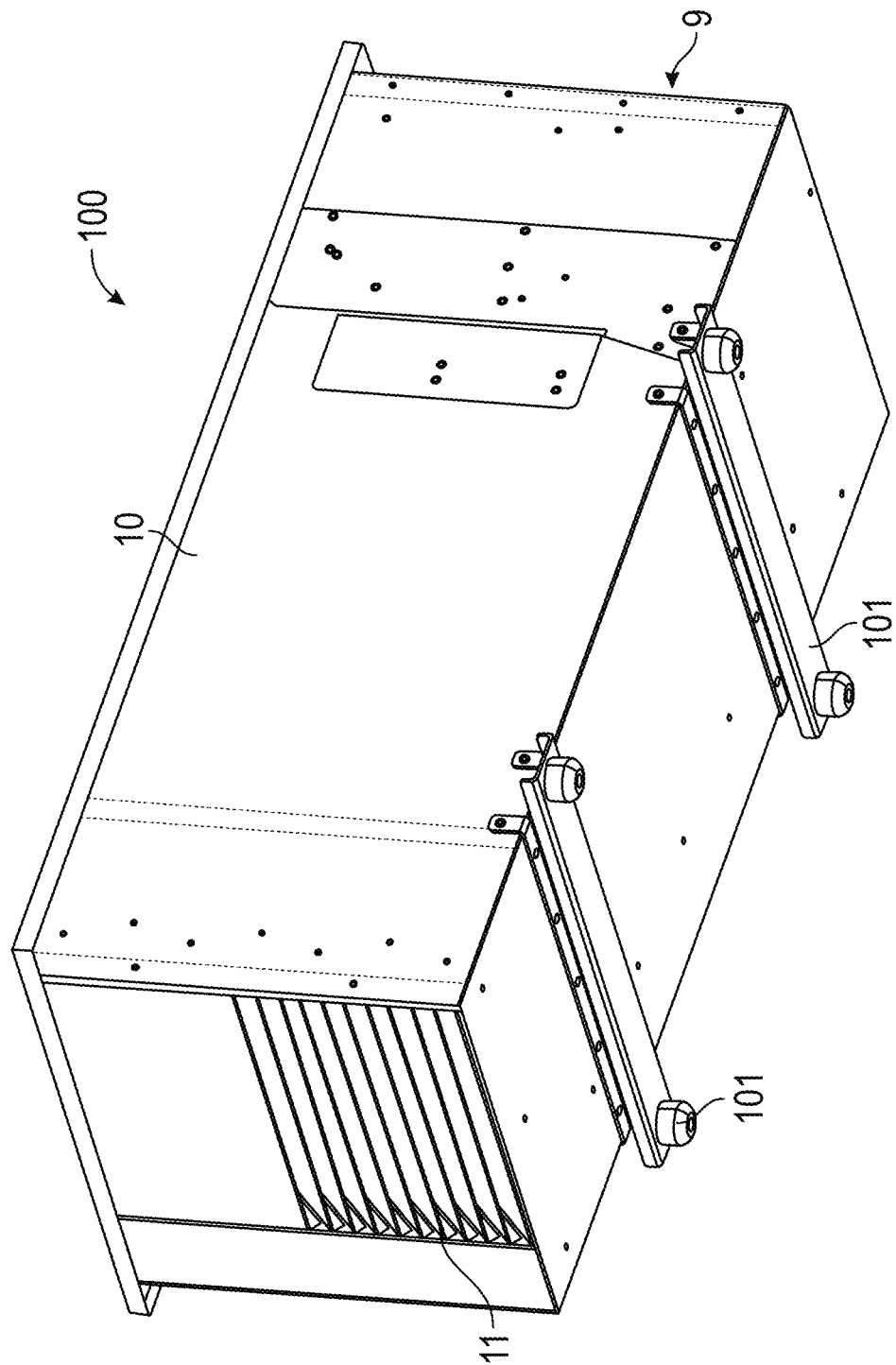
FIG. 2 shows a bottom rear right perspective view of the FIG. 1 air treatment apparatus.

FIG. 1 is a top front left perspective view and FIG. 2 is a bottom rear right perspective view of an air treatment apparatus 100 including components that can be employed to achieve at least some objectives described herein. The apparatus 100 includes a housing 10 having an air inlet 11 to receive air into the housing 10 and an air outlet 9 to exhaust treated air. An air mover 5 is arranged to move air along an air flow path in the housing 10 from the inlet 11 to a treatment area in the housing 10 and then to the outlet 9. A controller 7 is configured to control operation of the components of the apparatus 100, such as the air mover 5, and can include any suitable hardware, software and other components to perform various component control and other functions described herein. An access panel 102 can be removable to access portions of the controller 7, such as electronic ballast components for powering UV lights, the air mover 5, etc., and/or other components of the apparatus 100. A base 101 is configured to support the housing 10, e.g., by positioning the base 101 on a surface such as a floor and/or by engaging the base with other structural elements such as hanger wire or brackets so the housing 10 is hung from a ceiling or other structure.

Figure 3:
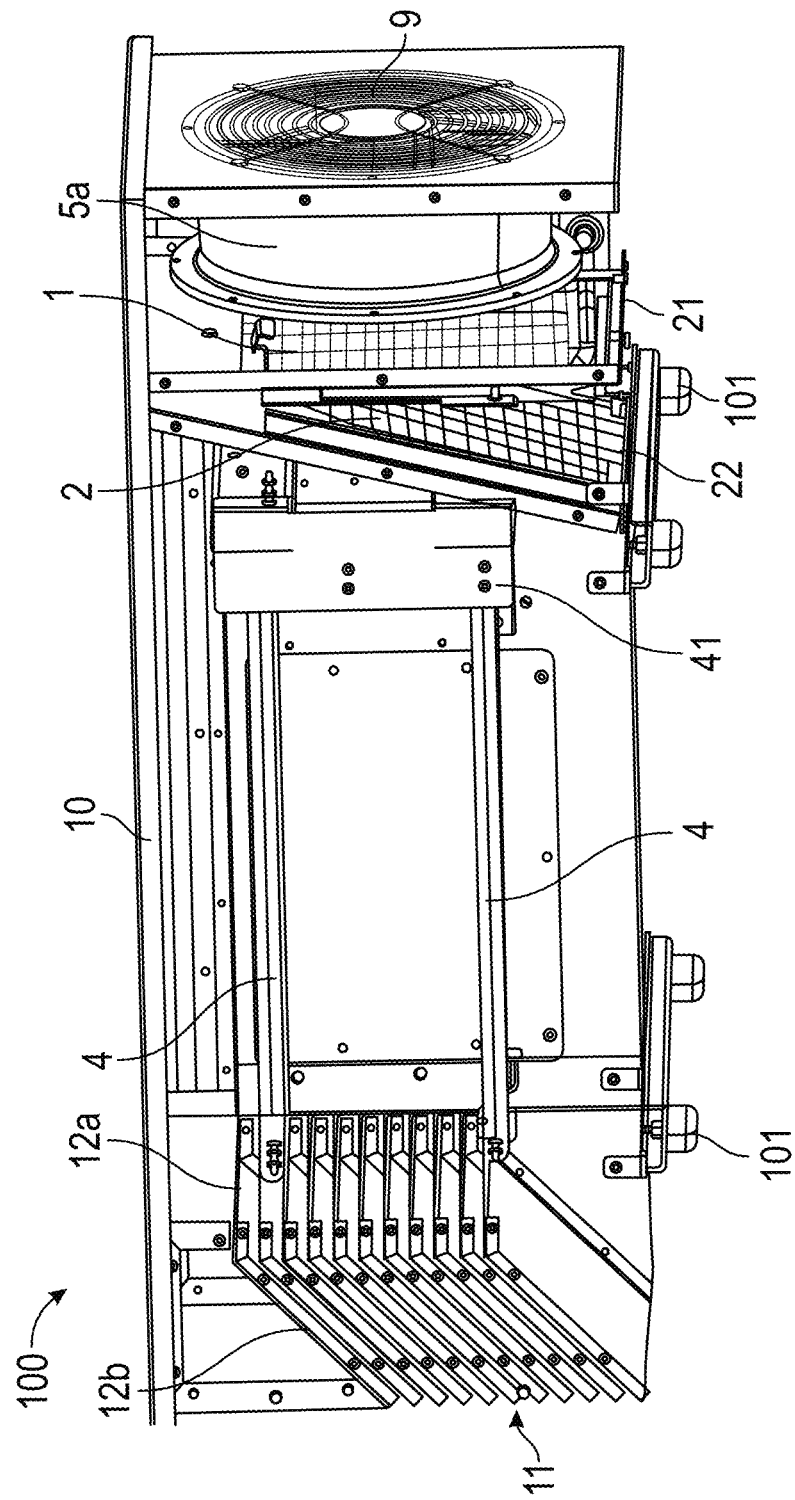
FIG. 3 shows a rear left perspective view of the FIG. 1 air treatment apparatus with a rear housing panel removed.

FIG. 3 shows a rear left perspective view of the air treatment apparatus 100 with a rear housing panel removed. In this embodiment, the air mover 5 includes a cylindrical shroud **5*a* in which a motor-driven fan 5*b* is arranged to pull air into the air inlet 11 (e.g., through a grille) and move the air into a treatment area in the housing 10. The air mover 5 can be arranged in other ways to move air through the housing 10, e.g., using compressed air, etc. Upstream of the air mover 5 are first and second catalyst elements 1, 2 arranged so the first catalyst element 1 is downstream of the second catalyst element 2. An optional filter can be arranged in the air flow path, e.g., at the air inlet 11 or otherwise upstream of the air mover 5, to remove relatively large material from the air flow and prevent its entering downstream areas of the apparatus 100. The filter can be any suitable type of particulate filter, such as a grease filter or other. In some embodiments, no filter is provided in the apparatus 100. Each of the first and second catalyst elements 1, 2 have a plurality of air flow channels that extend in a direction from an inlet side to an outlet side of the catalyst element 1, 2. The air flow channels are arranged to transmit air moving along the air flow path in the housing 10 from the inlet side to the outlet side of the first and second catalyst elements 1, 2, respectively. Thus, air passes into inlet side of the air flow channels of the second catalyst element 2, exits at the outlet side of the second catalyst element 2, and then passes into the inlet side of the air flow channels of the first catalyst element 1 and exits at the outlet side of the first catalyst element 1 to flow to the air mover 5. Each of the first and second catalyst elements 1, 2 are supported by a respective catalyst support 21, 22, e.g., a frame with an opening in which the catalyst element 1, 2 is held. As noted above, the first and/or second catalyst elements 1, 2 can be arranged to destroy or otherwise remove VOCs and/or other contaminants from air passing through the housing 10, and may do so at ambient temperatures and/or elevated temperatures. As an example, a heater can be provided to heat the air and/or the catalyst elements 1, 2 to aid in the decontamination activity of the catalyst elements 1, 2**.

Air entering the air inlet 11 flows downstream along the air flow path to one or more UV lights 4 arranged in a UV chamber of the housing 10. In this embodiment, the UV lights 4 are each a U-shaped bulb that extends lengthwise along the air flow path, but the UV lights 4 could be arranged in other ways, e.g., as a plurality of LED elements arranged on a support extending along the air flow path. The UV lights 4, which together are a UV illumination source, are arranged to expose air moving along the air flow path to UV illumination suitable to inactivate microorganisms in the air. For example, the UV illumination source can be configured to inactivate 90% to 100% of aerosolized *bacillus atrophaeus* spores and/or MS-2 bacteriophage carried by air in a single pass through the apparatus 100. In some embodiments, the UV illumination source 4 is arranged to emit a germicidal UV wavelength or set of wavelengths configured to destroy or otherwise inactivate bacteria, viruses, spores and/or other organisms that are carried by air flowing through the housing 10. In some embodiments, the UV illumination source 4 is arranged to produce little or no ozone while emitting UV illumination suitable to inactivate microorganisms.

Upstream of the UV illumination source 4 is an inlet light baffle 12 that is arranged to direct air to the UV illumination source 4 while blocking UV light from exiting the housing 10 at the air inlet 11. In this embodiment, the inlet light baffle 12 includes an inlet part **12*b* and an outlet part 12*a*. The outlet part 12*a* includes a plurality of flat panels that each extend horizontally and are stacked vertically with a gap or space between adjacent flat panels. The inlet part 12*b* is similarly arranged with multiple panels stacked over each other and a gap or space between adjacent flat panels. However, the panels of the inlet part 12***b* are arranged at an angle relative to the panels of the outlet part 12*a* so that air can flow from the gaps between panels of the inlet part 12*b* into gaps between panels of the outlet part 12*a*, but so UV light cannot pass from the outlet part 12*a* to the air inlet 11. The relative angle between panels of the outlet and inlet parts 12*a*, 12*b* can be between 10 degrees and 90 degrees, e.g., 20 to 60 degrees. Other arrangements for the inlet light baffle 12 are possible, as discussed more below.

In some embodiments, the UV illumination source 4, air inlet 11, air mover 5 and/or other components of the apparatus 100 can be configured such that UV light can exit through the air outlet 9 if the first and/or second catalyst elements 1, 2 are not in place with respect to the catalyst supports 21, 22. For example, the apparatus components can be arranged so that UV light can be transmitted directly and/or indirectly (e.g., via reflection) from a UV illumination source 4 to the air outlet 9 if the first and/or second catalyst elements 1, 2 are not in place. In other words, the first and/or second catalyst elements 1, 2 can be arranged to block UV light from exiting through the air outlet 9. (In the discussion below, the first and/or second catalyst elements 1, 2 are arranged to block UV light from exiting the air outlet 9. However, additionally or alternately, the inlet light baffle 12 can be eliminated and the first and/or second catalyst elements 1, 2 positioned upstream of the UV illumination source 4 and arranged to block UV light from exiting the air inlet 11. First and/or second catalyst elements 1, 2 may remain downstream of the UV illumination source 4, or be eliminated at the downstream position and a light baffle arranged to block UV light from exiting the air outlet 9.) Providing the first and/or second catalyst elements 1, 2 with a UV light blocking feature can provide advantages such as eliminating any need for additional light blocking structure at or near the air outlet 9 as well as allowing UV illumination to be incident on the first and/or second catalyst elements 1, 2. UV illumination incident on the first and/or second catalyst elements 1, 2 can help clean the catalyst elements 1, 2 (e.g., by breaking down or otherwise deactivating or destroying the chemical structure of contaminants on the elements 1, 2) and/or aid in the catalytic activity of the elements 1, 2 (e.g., the elements 1, 2 can include catalytic components that have an enhanced activity or effectiveness with illuminated with UV light as is the case with some photocatalysts). Thus, in some cases UV illumination can be emitted directly from the UV source 4 to the inlet side of the second catalyst element 2 as well as optionally to the inlet side of the first catalyst element 1. (Where the first and/or second catalyst elements 1, 2 are positioned upstream of the UV source 4, UV illumination can be emitted directly from the UV source 4 to the outlet side of the first catalyst element 1 as well as optionally to the outlet side of the second catalyst element 2 where the first catalyst element 1 is downstream of the second catalyst element 2.)

Figure 11:
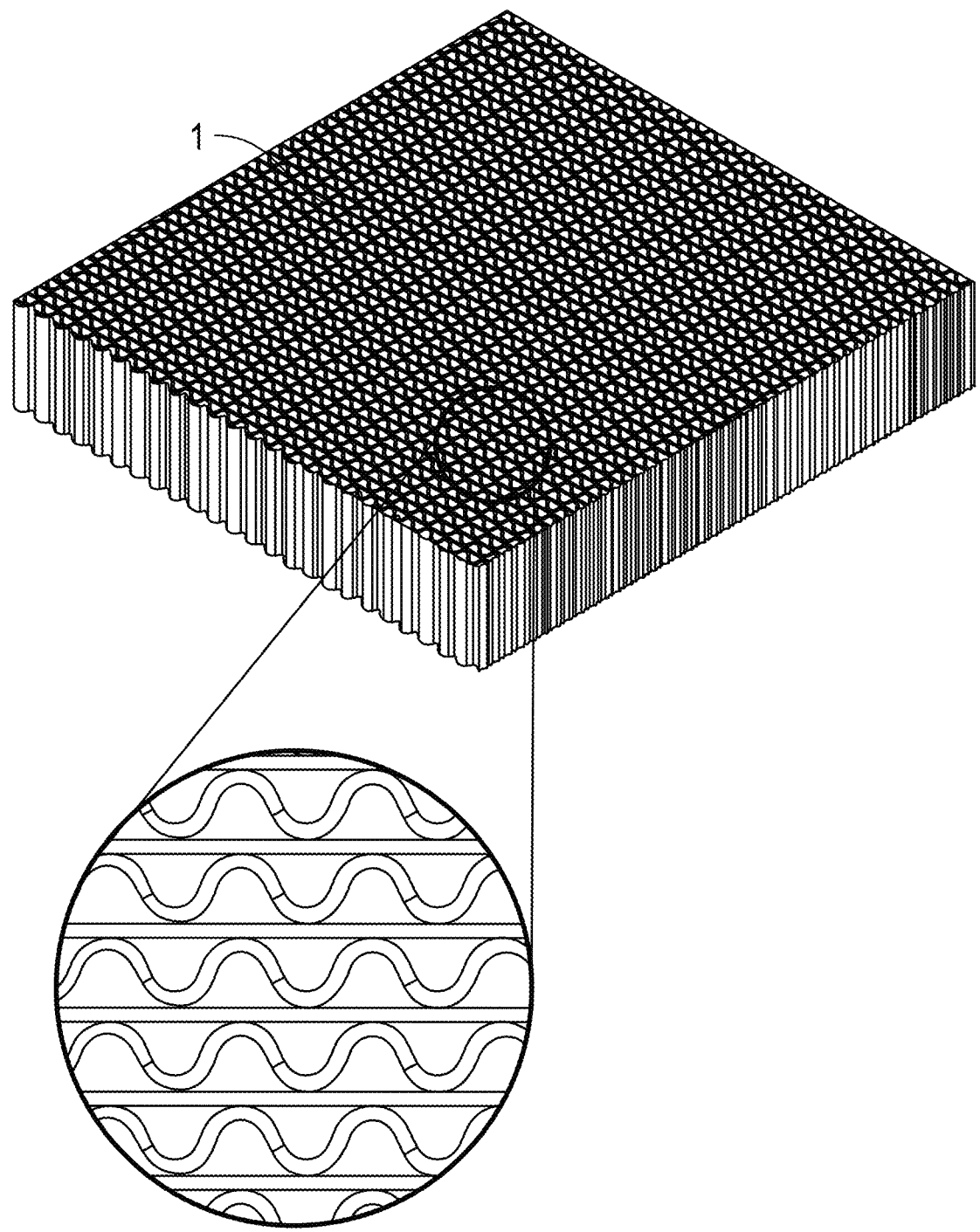
FIG. 11 shows a perspective view of a set of illustrative air flow channels for a catalyst element.

The first and/or second catalyst elements 1, 2 can be arranged in different ways to block UV light from reaching the air outlet 9 (or inlet 11). In one example, the first and/or second catalyst elements 1, 2 can each include multiple air flow channels that extend perpendicularly to a plane of the inlet and/or outlet side of the element 1, 2. FIG. 11 shows a perspective view of a first catalyst element 1 having a set of illustrative air flow channels in which the air flow channels extend perpendicularly from the inlet side to the outlet side, e.g., the inlet and outlet sides are in parallel planes and the air flow channels extend perpendicularly between those planes through the depth of the catalyst element. In FIG. 11, the air flow channels are formed by sandwiching corrugated plates having a sinusoidally shaped wave pattern between flat plates to define the air flow channels having an approximately trapezoidal shape in cross section to the length along which the air flow channels extend. The air flow channels can have a cross sectional size of about 0.04 inches and a length of about 0.4 inches, but these dimensions can be varied as desired. While this is one example, forming the air flow channels in this way and/or with this shape is not required. The air flow channels can each have any suitable cross sectional shape taken in a direction perpendicular to the direction in which the air flow channels extend, such as square, rectangular, irregular, hexagonal (e.g., as in a honeycomb structure), and others, and any suitable size (e.g., largest dimension as measured perpendicular to the axis or direction in which the flow channel extends) and can be formed in any suitable way (such as by bundling individual conduit segments together, drilling holes through a plate to form the air flow channels, etc.). The air flow channels can have a constant cross sectional size along their length, e.g., as a square tube, or have a variable size and/or shape along their length. The first and/or second catalyst elements 1, 2 can be arranged at an angle relative to each other, e.g., with the first catalyst element 1 arranged with the air flow channel direction parallel to the air flow path and the second catalyst element 2 arranged with the air flow channel direction at a slant angle of 10 to 80 degrees to the air flow path, e.g., 10 to 60 degrees, or about 14 degrees in some embodiments such when using a catalyst element 1, 2 as in FIG. 11. (Note however that the second catalyst element 2 can be oriented with its air flow channels directed parallel to the air flow path and the first catalyst element oriented with its air flow channels arranged at a slant angle to the air flow path. Where a catalyst element nearest the UV source is oriented to have air flow channels parallel to the air flow path, the catalyst element can effectively collimate the UV light. The catalyst element further from the UV source can be oriented at a slant angle to block the collimated light.) In some cases, the slant angle at which the catalyst element is oriented can be at least the arctan of the ratio of the opening size of each of the air flow channels in the catalyst element to the length of the air flow channels (which can be effective for blocking collimated light or light that otherwise is directed along the air flow path because no straight line path through the air flow channels that is parallel to the air flow path is provided). The opening size can be the maximum size of the air flow channels in a direction perpendicular to the direction in which the air flow channels extend, e.g., the diameter of an air flow channel having a cylindrical shape. The length can be the length of the air flow channels, or the distance between the inlet and outlet sides of the catalyst element where the inlet and outlet sides are arranged in parallel planes.

This arrangement of the air flow channels of the first and/or second catalyst elements 1, 2 at an angle relative to each other as well as the distance along which the air flow channels extend can function to prevent the transmission of UV light through the catalyst elements to the air outlet 9 (or air inlet 11 where the catalyst element are upstream of the UV illumination source 4). Moreover, UV light can be blocked from reaching the air outlet 9 (or inlet 11) while allowing the UV light to illuminate at least portions of the air flow channels in the first and/or second catalyst elements 1, 2.

In some cases, the air flow channels in the first and second catalyst elements 1, 2 can be configured in the same way, e.g., having the same opening size and length and arranged to be perpendicular to the inlet and outlet sides of the catalyst element. Arranging the air flow channels in the same way in both the first and second catalyst elements 1, 2 can provide advantages, such as avoiding any need to ensure that the first and second catalyst elements 1, 2 are located in the proper support 21, 22. Instead, the catalyst elements 1, 2 can be interchangeable, avoiding any bad effects if the elements 1, 2 are positioned improperly. In some embodiments, the catalyst supports 21, 22 can operate to orient the air flow channels of the elements 1, 2 in the desired way, e.g., with the air flow channels of the first catalyst layer 1 parallel to the air flow path and the air flow channels of the second catalyst layer 2 arranged at an angle (e.g., of 10-45 degrees or more) to the air flow path. However, while in this example the first and second catalyst elements 1, 2, are arranged in the same way with respect to the size, shape and direction in which flow channels extend through the element, the elements 1, 2 can be arranged in different ways, e.g., by including different catalyst compounds and/or air flow channel arrangements. As an example, the first catalyst element 1 can be arranged as described above with the air flow channels extending in a direction perpendicular to the plane of the inlet and/or outlet side of the element 1, while the second catalyst element 2 can be arranged with air flow channels extending at an angle, e.g., of 10 to 60 degrees, relative to the plane of the inlet and/or outlet side of the element 2. This arrangement can allow the second catalyst element 2 itself to block UV illumination so UV illumination is prevented from reaching the inlet side of the first catalyst element 1. In cases where the first and second catalyst elements 1, 2 are arranged with air flow channels arranged differently, the inlet/outlet sides of both elements 1, 2 can be arranged perpendicular to the air flow path or otherwise arranged in a same way relative to an air flow direction while still providing a light blocking function.

In some embodiments, components of the air treatment apparatus 100 are arranged to provide a relatively low pressure drop and/or uniform flow of air through the UV chamber. Providing for a relatively low pressure drop for flow through the housing 10, or at least portions of the housing 10, can provide benefits such as reducing energy needed to move air through the housing 10 and/or reducing noise caused by turbulent air flow and/or the air mover operation. In some cases, light baffles can cause relatively high pressure drops for flow through the light baffle, e.g., because of the tortuous flow path through the baffle. In some embodiments, the first and second catalyst elements 1, 2 are arranged to provide a pressure drop of 3 to 6 mm H2O for face velocities of 0.5 to 1.5 m/sec. This relatively low pressure drop can reduce noise created by air flow through the apparatus 100 and/or reduce power requirements for the air mover 5. The first and second catalyst elements 1, 2 can also provide for uniform, generally laminar and non-turbulent flow through the first and second catalyst elements 1, 2. This can provide benefits such as providing uniform flow of air past the UV illumination source 4. To destroy or otherwise deactivate microorganisms with UV light, the microorganisms must receive a minimum dose of UV energy. As a result, microorganisms must spend at least a minimum amount of time (or residence time) in the UV chamber of the apparatus 100 to ensure a relatively high inactivation rate, e.g., of 90 to 100%. Providing a uniform air flow through the UV chamber provides improved residence time for air and microorganisms carried by the air, and so improves the deactivation performance of the apparatus 100.

Figure 4:
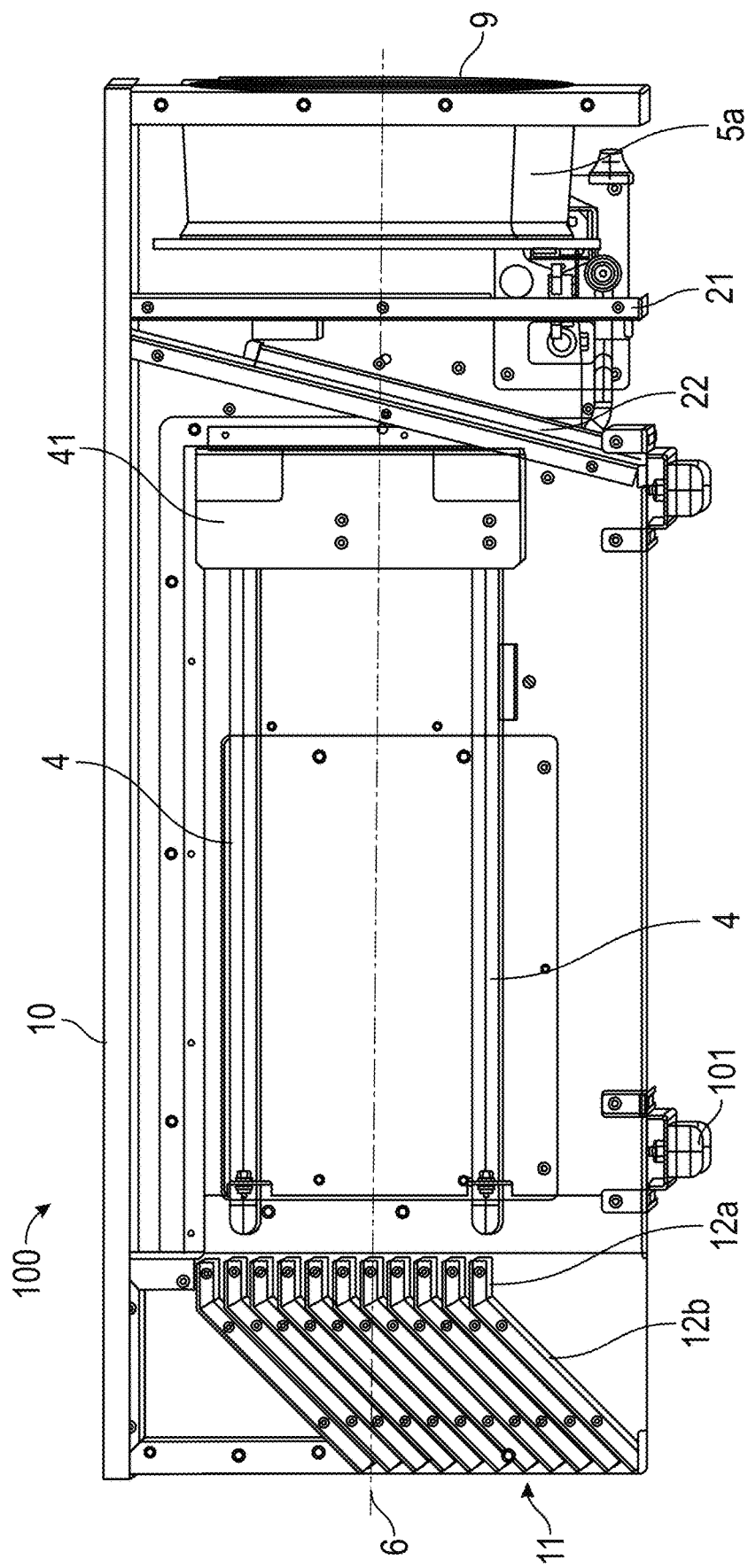
FIG. 4 shows a rear view of the FIG. 1 air treatment apparatus with the rear housing panel removed.

FIG. 4 shows a rear side view of the air treatment apparatus 100 and illustrates how the first and second catalyst elements 1, 2 are arranged at an angle relative to each other. As noted above, in this embodiment, the first and second catalyst elements 1, 2 include air flow channels that extend in a direction perpendicular to the inlet and outlet sides of the elements 1, 2. The first catalyst element 1 is arranged so the air flow channels extend in a direction parallel to the air flow path 6 through the housing 10, whereas the second catalyst element 2 is arranged so the air flow channels are at an angle of 75 degrees to 45 degrees, although other angles are possible. FIG. 4 also illustrates that the inlet side of the first catalyst element 1 is spaced apart from the outlet side of the second catalyst element 2. In some embodiments, the inlet side of the first catalyst element 1 is spaced apart from the outlet side of the second catalyst element 2 by a distance that is greater than a length between the inlet and outlet side of both the first and second catalyst elements. Or said another way, the air flow channels of the first and second catalyst elements 1, 2 have a length that is less than the distance between the outlet side of the second catalyst element 2 and the inlet side of the first catalyst element 1. The relatively short flow path of the first and second catalyst elements 1, 2 can provide significantly reduced resistance to air flow while spacing the first and second catalyst elements 1, 2 apart can enhance the light blocking function. In some cases, the air mover 5 is positioned within the housing 10 at a distance of at least 0.5 inches from the inlet side of the second catalyst element 2, e.g., 0.5 inches to 5 inches.

FIG. 4 also illustrates how the air flow path 6 includes a straight line from the air inlet 11 to the air outlet 9 that passes through the first and second catalyst elements 1, 2 and the UV illumination source 4. A relatively straight air flow path, e.g., through the UV chamber where the UV illumination source 4 is located, can help avoid turbulence, restriction to flow and attendant noise created by the air flow and air mover 5.

Figure 5:
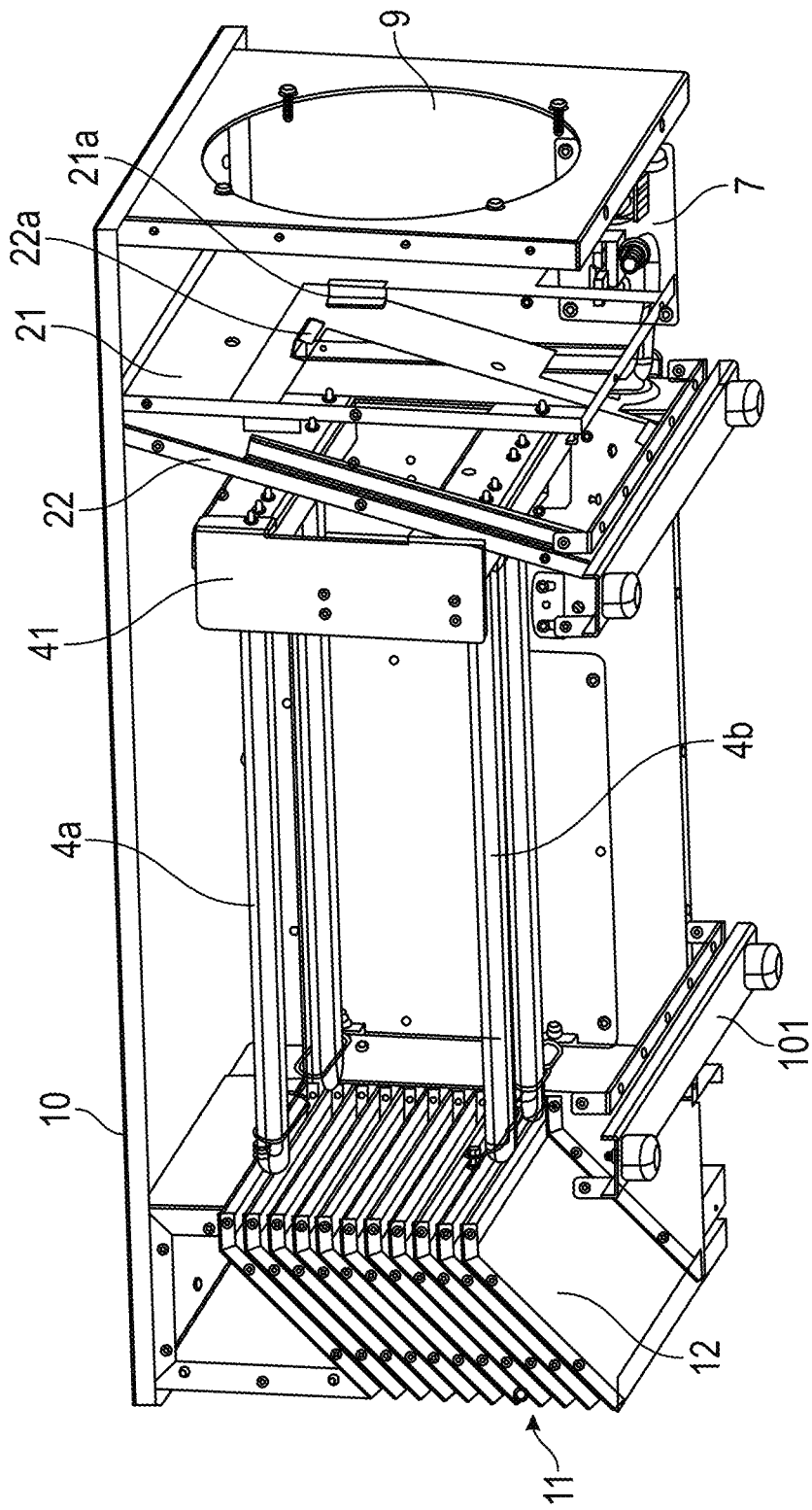
FIG. 5 shows a bottom rear left perspective view of the FIG. 1 air treatment apparatus with the rear and bottom housing panel and air mover removed.
Figure 6:
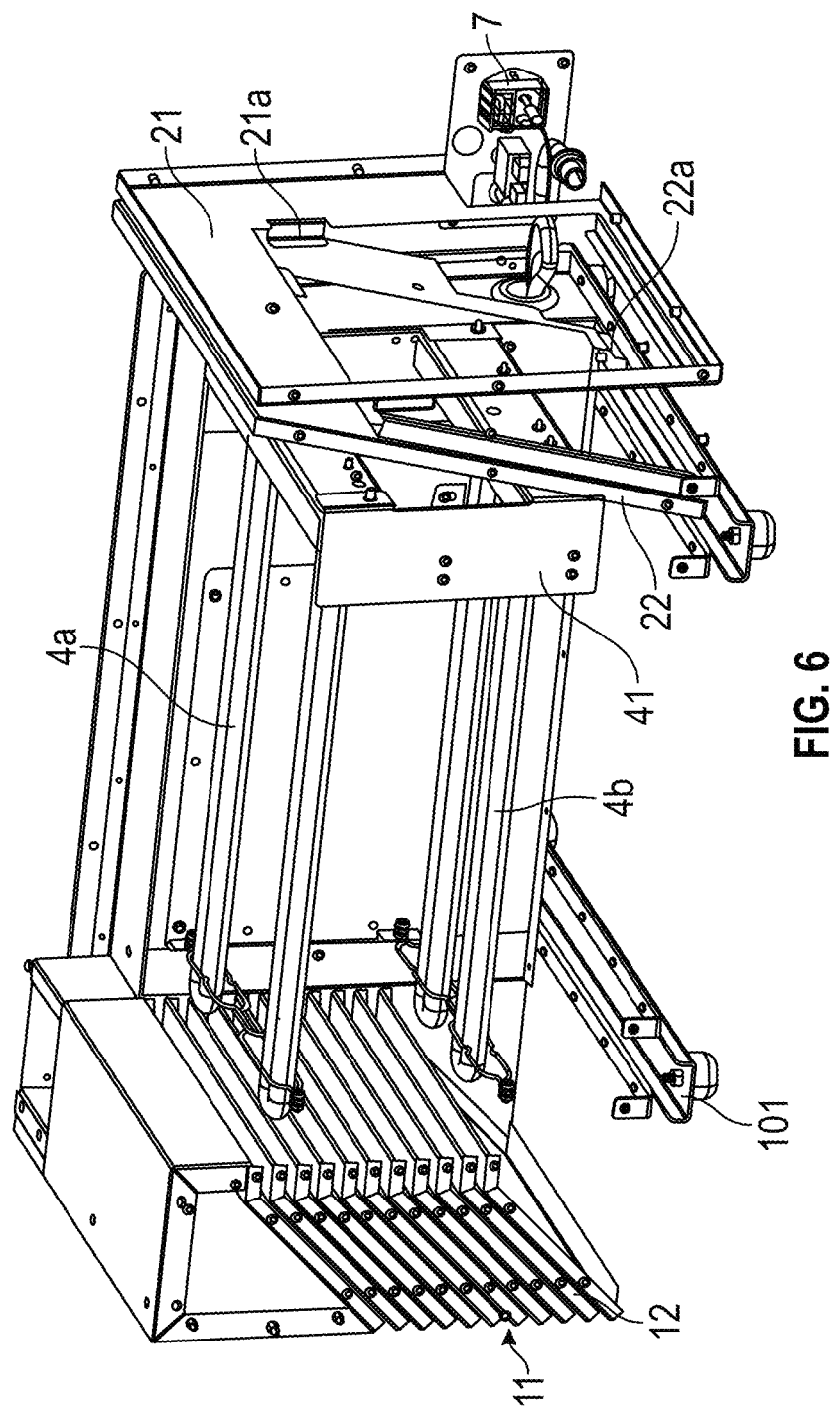
FIG. 6 shows a top rear left perspective view of the FIG. 1 air treatment apparatus with the housing panels removed.
Figure 7:
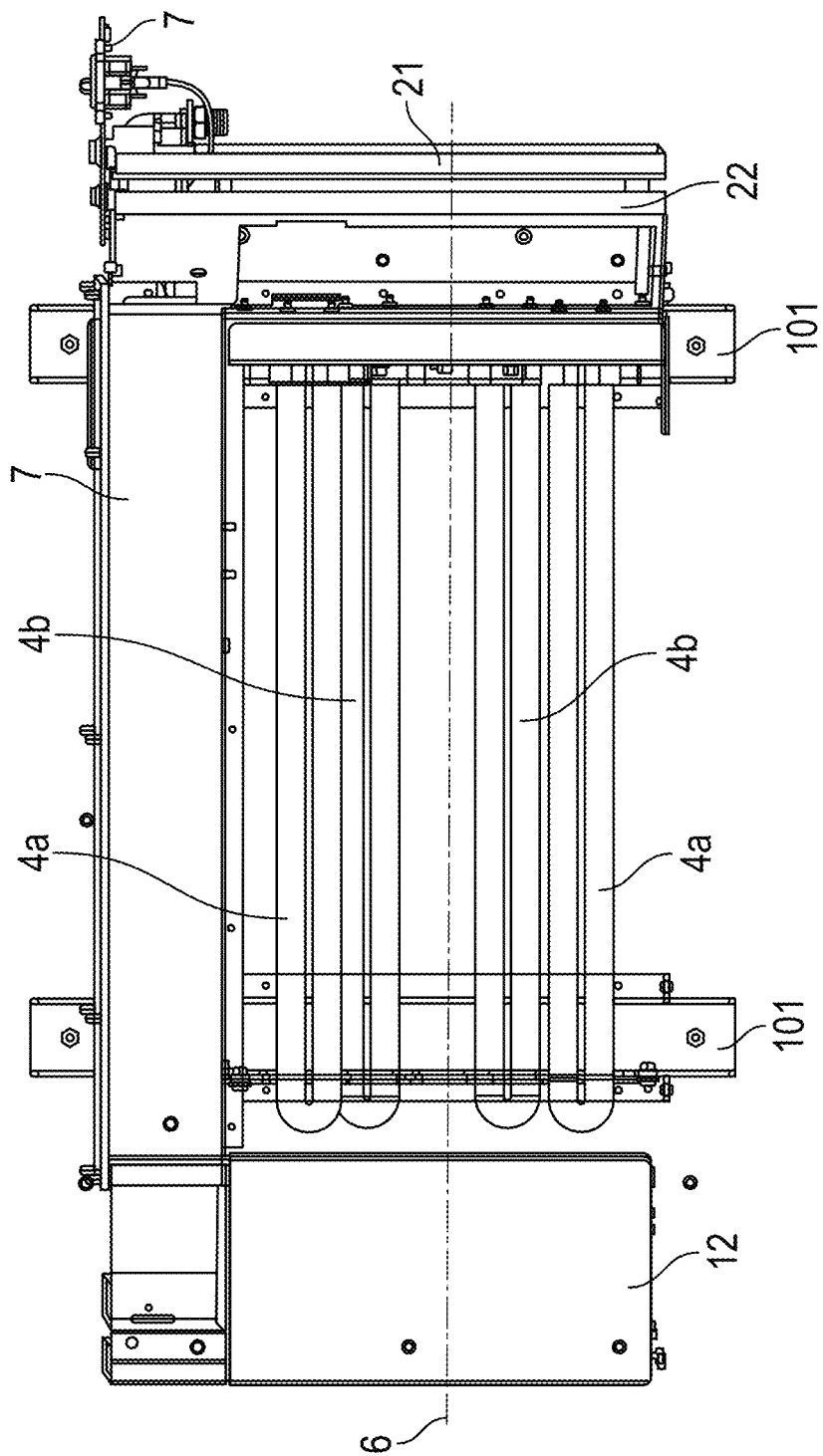
FIG. 7 shows a top view of the FIG. 1 air treatment apparatus with the housing panels removed.

FIGS. 5 and 6 show views of components of the air treatment apparatus 100 with the housing panels 10 and the first and second catalyst elements 1, 2 removed. In this embodiment, the first and second catalyst elements 1, 2 are held in the catalyst supports 21, 22 by L-shaped brackets 21a, 22a at the openings in the supports 21, 22 where the first and second catalyst elements 1, 2 are held. Thus, the first and second catalyst elements 1, 2 can be inserted into the corresponding opening of a catalyst support 21, 22 until engaged by one or more brackets 21a, 22a. A fastener can then be used to hold the first and second catalyst elements 1, 2 in the openings, or can be held in place by a friction fit, latch, etc. The UV illumination source 4 includes four UV bulbs each having a U-shape and a connector end engaged with a corresponding electrical connector at a UV light support 41. The UV illumination source 4 includes two upper UV bulbs 4a and two lower UV bulbs 4b. The upper UV bulbs 4a are arranged in a same upper plane and the lower UV bulbs 4b are arranged in a same lower plane. As can be seen in FIG. 7, the upper UV bulbs 4a are spaced apart a distance in the upper plane (e.g., in a direction perpendicular to the air flow path 6) that is greater than a distance between the lower UV bulbs 4b in the lower plane. This arrangement helps ensure better exposure of air and contaminants to UV illumination in the UV chamber, e.g., because light from all bulbs can transmit to the extreme upper and lower surfaces of the UV chamber and/or because a more evenly distributed flux of UV light is provided in the UV chamber. For example, if the upper and lower bulbs were positioned in a same vertical plane, the UV radiation would be of higher total intensity or energy directly between the bulbs than in other locations, such as directly above the upper bulb or directly below the lower bulb.

Figure 8:
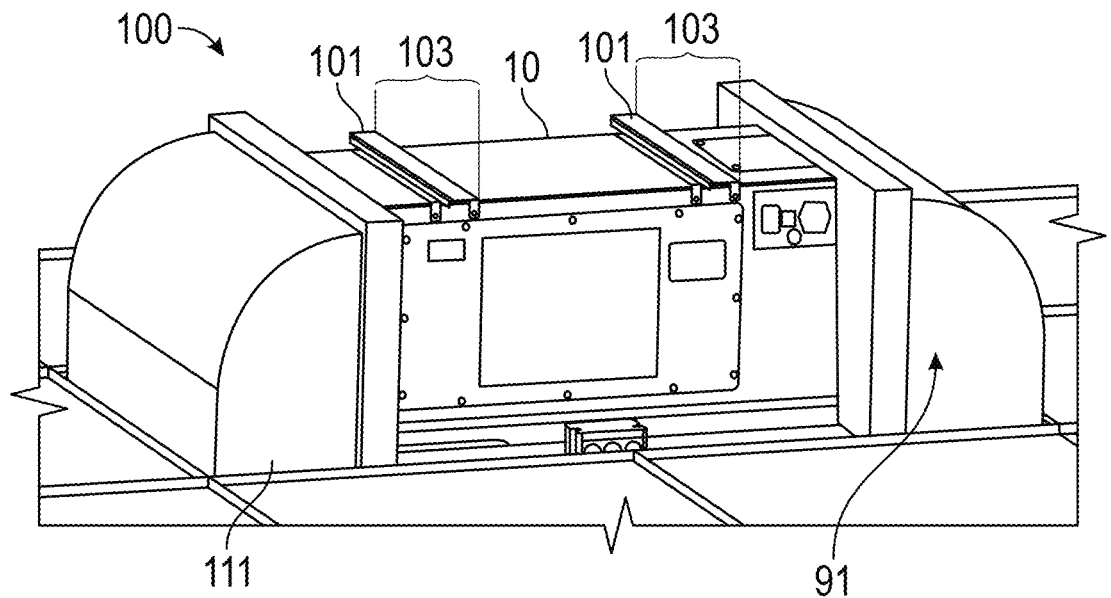
FIG. 8 shows the FIG. 1 air treatment apparatus deployed in a ceiling application.
Figure 9:
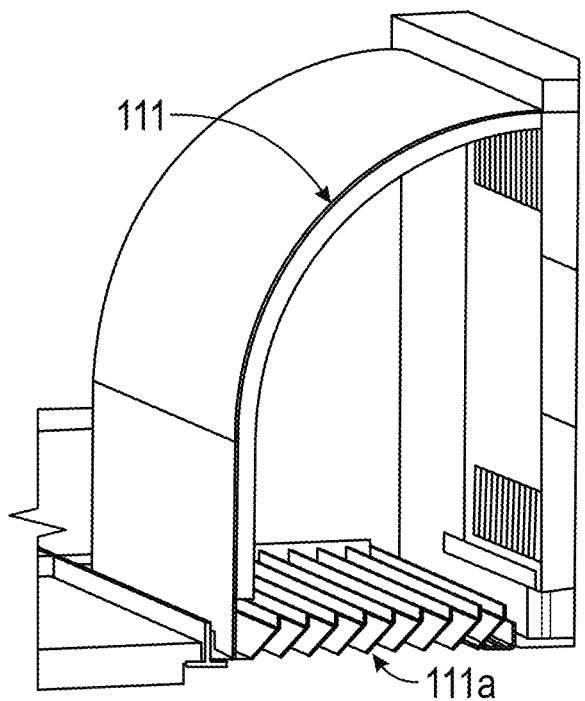
FIG. 9 shows an exhaust plenum in the FIG. 8 embodiment.

FIG. 8 shows the air treatment apparatus 100 in a ceiling application, e.g., where the apparatus 100 is located above a ceiling surface defined by drop ceiling panels. Note that in this embodiment, the housing 10 is oriented in an upside down configuration with the base 101 positioned over the housing 10. The apparatus 100 is configured to be operated in any orientation including those in FIGS. 1-8 as well as where the air flow path 6 is arranged in a vertical direction or any suitable angle to the horizontal. In this embodiment, the base 101 is secured to hanger wires or brackets 103 that support the housing 10. Also provided are an exhaust plenum 91 and an intake plenum 111 that are fluidly coupled to the air inlet 11 and the air outlet 9 of the housing 10. The exhaust and intake plenums 91, 111 allow the housing 10 to be recessed above a lower ceiling surface and receive and return air through openings in the ceiling that are connected to the exhaust and intake plenums 91, 111. FIG. 9 shows a cross sectional view of the intake plenum 111 an illustrates the curved shape of the plenum 111 which is arranged to help reduce a pressure drop for flow through the plenum 111. The exhaust plenum 91 may be similarly arranged, and both plenums 91, 111 can include acoustic insulation that lines the interior surfaces of the plenums 91, 111, e.g., an acoustic foam or other insulation can be adhered to the interior surfaces. The openings of the plenums 91, 111 to room space below the ceiling can include louvers 111a, e.g., to help shield the housing 10 and other parts of the system above the ceiling surface and/or help direct air into or out of the openings in directions away from the apparatus 100.

Figure 10:
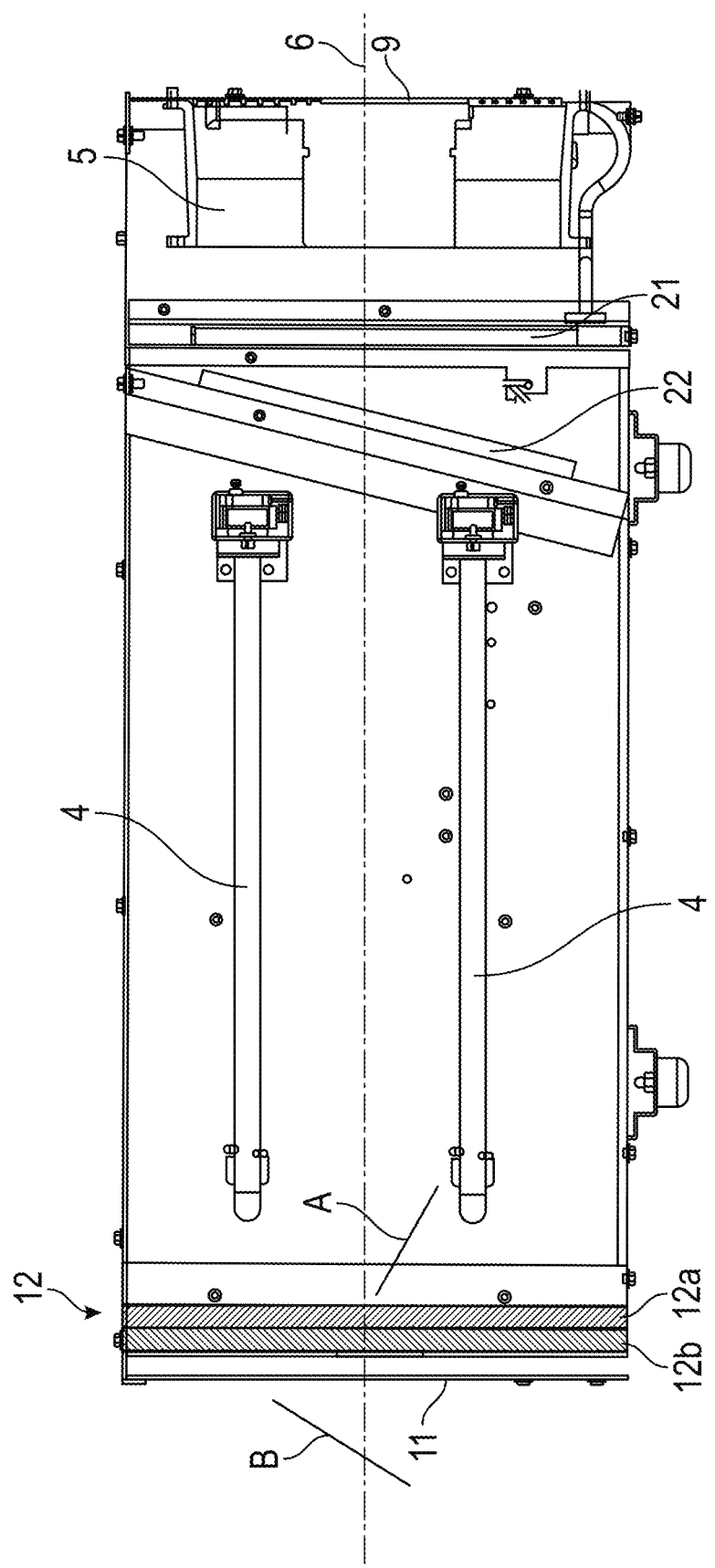
FIG. 10 shows a rear view of an air treatment apparatus similar to that of FIG. 1 with the rear housing panel removed and illustrating an alternative arrangement for a light baffle.

FIG. 10 shows a rear view of an air treatment apparatus similar to that of FIG. 1 with the rear housing panel removed. However, FIG. 10 illustrates an alternative arrangement for a light baffle 12 (e.g., for use at or near an air inlet 11 and/or outlet 9) as compared to that shown in FIG. 4. The light baffle 12 of FIG. 10 includes outlet and inlet parts 12a, 12b similar to that in FIG. 4. However, in the embodiment of FIG. 10, each of the outlet and inlet parts 12a, 12b include flow channels that are defined by wall elements that define a tubular shape (e.g., square, hexagonal, etc.) having a relatively small cross sectional area as compared to their length rather than flat plates that extend horizontally across the housing 10 to define slot-like flow channels. In some cases, the outlet and inlet parts 12a, 12b can be configured in a way similar (or identical) to the catalyst elements 1, 2, e.g., with flow channels that extend in a particular direction from an inlet side to an outlet side of the outlet or inlet part 12a, 12b. The direction in which the flow channels extend can be arranged at a suitable angle relative to the plane of the inlet and/or outlet side of the outlet or inlet part 12a, 12b. For example, the air flow channels can be arranged to transmit air moving along the air flow path of the air treatment apparatus and extend in a direction from an inlet side to an outlet side of the light baffle, where the direction is inclined relative to a line perpendicular to a plane of the inlet side by a slant angle, e.g., of 10 degrees to 45 degrees. For example, FIG. 10 shows illustrative directions A and B along which flow channels of the outlet and inlet parts 12a, 12b can extend. The directions A and B can be different from each other (or the same) and can be arranged at an angle relative to a line perpendicular to a plane of the inlet side of the outlet and inlet parts 12a, 12b (respectively, e.g., the line can extend in the same direction as the air flow path 6). In some embodiments, the direction A can be inclined downwardly relative to the air flow path 6 and/or the plane of the inlet side of the outlet part 12a, and the direction B can be inclined upwardly relative to the air flow path 6 and/or the plane of the inlet side of the inlet part 12b. In this example, inclined "upwardly" refers to the concept that as one moves from upstream to downstream, the direction along which the flow channels extends is directed upwardly in FIG. 10, whereas "downwardly" refers to the concept that as one moves from upstream to downstream, the direction along which the flow channels extends is directed downwardly in FIG. 10. One of ordinary skill will understand that these are simply references to aid in illustration and that the flow channels can be inclined in directions other than "upward" or "downward", e.g., could be inclined in a horizontal plane as viewed in FIG. 10.

In some embodiments, the air flow channels can have an opening size that is a maximum distance across the air flow channel in a direction perpendicular to the direction in which the air flow channel extends, and the angle at which the flow channels are inclined relative to the inlet side of the inlet or outlet part (referred to as a slant angle) can be at least the arcsin of the ratio of the opening size to a distance between the inlet and outlet sides of the inlet or outlet part (referred to as a baffle depth). This configuration of the flow channels can help prevent light that is directed perpendicular to the inlet side of the inlet or outlet part 12a, 12b from passing through the inlet or outlet part 12b, 12a. In some cases, this can enable the use of only one light baffle, e.g., only one inlet part 12b or only one outlet part 12a.

The outlet and/or inlet part 12a, 12b can be arranged to have characteristics or other features of the catalyst elements 1, 2, and similarly the catalyst elements 1, 2 can have features of the light baffle 12 such that these elements can be interchangeable. For example, the outlet and inlet parts 12a, 12b in the FIG. 10 embodiment can include catalyst materials that enable the outlet and inlet parts 12a, 12b to oxidize or otherwise convert contaminants to harmless components whether in combination with heat or not. Similarly, the catalyst elements 1, 2 need not be capable of converting contaminants in any significant way. In FIG. 10, the outlet and inlet parts 12a, 12b have at least one side (the outlet side of the inlet part and the inlet side of the outlet part) positioned adjacent each other and arranged in a same plane, but these sides may be spaced from each other while arranged in a same plane, or spaced from each other while arranged in different planes, e.g., like that for the catalyst elements 1, 2. Note as well that the air mover 5 could be positioned in other ways, such as between the light baffle 12 and the air inlet 9. Also, flow through the apparatus 10 in the FIG. 1-10 embodiments could be reversed, e.g., by reversing the direction in which the air mover 5 moves air through the housing 10 but otherwise without changing the positioning of the apparatus components.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of illustration and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

For example, the term "air" is used in general in this document and it can be interpreted to include both natural air and/or any gaseous or vaporous matter.

Operation of the apparatus components may be controlled by the controller, which may include a programmed processor and/or other data processing device along with suitable software or other operating instructions, one or more memories (including non-transient storage media that may store software and/or other operating instructions), temperature and other sensors, pressure sensors, input/output interfaces (such as a user interface on the housing), communication buses or other links, a display, switches, relays, triacs, or other components necessary to perform desired input/output or other functions. A user interface may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. An air treatment apparatus, comprising:
a housing having an air inlet, an air outlet and an air flow path through the housing from the air inlet to the air outlet;
an air mover arranged to move air from the air inlet to the air outlet along the air flow path;
a UV illumination source in the housing and arranged along the air flow path to expose air moving along the air flow path to UV illumination suitable to inactivate microorganisms in the air;
a first catalyst element having a first plurality of air flow channels extending from an inlet side to an outlet side of the first catalyst element, the first plurality of air flow channels extending in a first direction and arranged to transmit air moving along the air flow path; and
a second catalyst element positioned upstream of the first catalyst element along the air flow path and having a second plurality of air flow channels extending from an inlet side to an outlet side of the second catalyst element, the second plurality of air flow channels extending in a second direction and arranged to transmit air moving along the air flow path;
wherein the first and second catalyst elements are arranged with the first and second directions at an angle relative to each other such that UV illumination from the UV illumination source that is incident on the inlet side of the second catalyst element or incident on the outlet side of the first catalyst element is prevented from being transmitted to the air inlet or the air outlet;
wherein the inlet side and the outlet side of the first and second catalyst elements each have an inlet plane and an outlet plane, respectively, wherein the inlet plane is parallel to the outlet plane in the first and second catalyst elements, wherein the first direction is perpendicular to the inlet plane and the outlet plane of the first catalyst element, wherein the second direction is perpendicular to the inlet plane and the outlet plane of the second catalyst element, wherein one of the first catalyst element and the second catalyst element is arranged so that the first direction or the second direction is parallel to the air flow path, and wherein the other of the first catalyst element and the second catalyst element is arranged so that the first direction or the second direction is oriented at a slant angle to the air flow path that is at least the arctan of the ratio of an opening size of each of the air flow channels to a length of each of the air flow channels, the opening size being a maximum distance across the air flow channel in a direction perpendicular to the first direction and the length being the distance from the inlet side to the outlet side of the first catalyst element.

2. The apparatus of claim 1, wherein the first and second catalyst elements are arranged with the first and second directions at an angle relative to each other such that no straight line light path exists from the outlet side of the first catalyst element to the inlet side of the second catalyst element.

3. The apparatus of claim 1, wherein walls that define the first and second pluralities of air flow channels are straight relative to the first and second directions, respectively.

4. The apparatus of claim 1, wherein a line extending from the air inlet to the air outlet passes through the first and second catalyst elements and the UV illumination source.

5. The apparatus of claim 2, wherein the UV illumination source is in a UV chamber and air flow along the air flow path in the UV chamber is along a straight line.

6. The apparatus of claim 2, wherein the first and second catalyst elements are arranged to remove VOCs from air passing through the first and second catalyst elements.

7. The apparatus of claim 1, wherein the first and second catalyst elements are arranged to provide a pressure drop of 3 to 6 mm H2O for face velocities of 0.5 to 1.5 m/sec.

8. The apparatus of claim 1, wherein the first and second catalyst elements are arranged to uniform flow that leads to 90% to 100% inactivation per pass of aerosolized bacillus atrophaeus spores and MS-2 bacteriophage.

9. The apparatus of claim 1, wherein the air mover is positioned between the air outlet and the UV illumination source, and the first and second catalyst elements are positioned between the air mover and the UV illumination source.

10. The apparatus of claim 1, wherein the UV illumination source includes an upper pair of UV emitters spaced apart a first distance and a lower pair of UV emitters spaced apart a second distance that is less than the first distance.

11. The apparatus of claim 10, wherein the UV emitters each extend along the air flow path.

12. The apparatus of claim 1, wherein the inlet side of the first catalyst element is spaced apart from the outlet side of the second catalyst element.

13. The apparatus of claim 12, wherein the inlet side of the first catalyst element is spaced apart from the outlet side of the second catalyst element by a distance that is greater than a length between the inlet and outlet side of each the first and second catalyst elements.

14. The apparatus of claim 1, wherein the air mover is positioned within the housing and at a distance of at least 0.5 inches from the inlet side of the second catalyst element.

* * * * *